(12) United States Patent
Watanabe et al.

(10) Patent No.: US 8,665,558 B2
(45) Date of Patent: *Mar. 4, 2014

(54) DISK DRIVE DEVICE

(71) Applicant: Samsung Electro-Mechanics Japan Advanced Technology Co., Ltd., Shizuoka (JP)

(72) Inventors: Takanori Watanabe, Shizuoka (JP); Mitsuo Kodama, Shizuoka (JP); Hiroshi Iwai, Shizuoka (JP); Akira Nishio, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,561

(22) Filed: Apr. 29, 2013

(65) Prior Publication Data

US 2013/0229093 A1 Sep. 5, 2013

Related U.S. Application Data

(62) Division of application No. 13/079,963, filed on Apr. 5, 2011, now Pat. No. 8,451,558.

(30) Foreign Application Priority Data

Apr. 14, 2010 (JP) ................................ 2010-092827

(51) Int. Cl.
*G11B 17/02* (2006.01)
*H02K 1/14* (2006.01)

(52) U.S. Cl.
USPC ................................ 360/99.08; 310/216.059

(58) Field of Classification Search
USPC ................ 360/99.08; 310/49.33, 90, 216.059
See application file for complete search history.

(56) References Cited

U.S. PATENT DOCUMENTS

| 5,233,253 | A | 8/1993 | Nishio et al. |
| 5,397,971 | A | 3/1995 | McAllister et al. |
| 5,705,871 | A | 1/1998 | Suzuki et al. |
| 5,834,866 | A | 11/1998 | Fujitani et al. |
| 7,327,064 | B2 | 2/2008 | Fujinaka |
| 7,489,059 | B2 | 2/2009 | Yajima |
| 7,608,958 | B2 | 10/2009 | Yajima |

(Continued)

FOREIGN PATENT DOCUMENTS

JP 2007198555 A 8/2007

*Primary Examiner* — Angel Castro
(74) *Attorney, Agent, or Firm* — Holtz, Holtz, Goodman & Chick (57) ABSTRACT

A disk drive device includes: a base member; a hub on which a recording disk is placed; a bearing unit arranged on the base member for rotatably supporting the hub; and a spindle drive unit for rotationally driving the hub, wherein the spindle drive unit includes a stator core having salient poles, a coil wound around each of the salient poles, and a magnet having a plurality of magnetic poles arranged in a circumferential direction opposed to the salient poles, the hub includes an outer cylindrical portion formed of a magnetic material and engaged with an inner periphery of the recording disk, and an inner cylindrical portion fixing an outer periphery of the magnet, the number of magnetic poles is an even number in a range of 10 to 16, and the number of salient poles is a multiple of 3 in a range of 12 to 24.

20 Claims, 5 Drawing Sheets

(56) References Cited

U.S. PATENT DOCUMENTS

| | | |
|---|---|---|
| 7,750,519 B2 | 7/2010 | Yoshikawa |
| 7,852,037 B2 | 12/2010 | Edelson |
| 8,506,168 B2 * | 8/2013 | Yamada et al. ............... 384/121 |
| 2013/0148241 A1 * | 6/2013 | Watanabe et al. .......... 360/99.08 |

* cited by examiner

DISK DRIVE DEVICE

CROSS-REFERENCE TO RELATED APPLICATION

This application is a divisional of U.S. application Ser. No. 13/079,963, filed Apr. 5, 2011 and is based on Japanese Patent Application No. 2010-092827 filed with the Japan Patent Office on Apr. 14, 2010, the entire content of which is hereby incorporated by reference.

BACKGROUND OF THE INVENTION

1. Technical Field

The invention relates to a disk drive device including a hub on which a recording disk is to be placed.

2. Related Art

In recent years, in a disk drive device such as a HDD, stiffness of a bearing is enhanced by providing a fluid dynamic bearing unit. The disk drive device having the fluid dynamic bearing unit is mounted in a small portable device in some cases. It is desired that a portable device be further reduced in thickness and weight. It is also desired that the disk drive device be further reduced in thickness and weight.

For example, JP-A-2007-198555 discloses a disk drive device having a fluid dynamic bearing unit in which a width of a first radial dynamic pressure groove in its axial direction is narrower than that of a second radial dynamic pressure groove in its axial direction.

SUMMARY

To thin the disk drive device, it is necessary to thin a spindle drive unit and the fluid dynamic bearing unit. If the spindle drive unit is further thinned, a torque is reduced in some cases, and rotation of a disk may become unstable. If the fluid dynamic bearing unit is further thinned, stiffness of the fluid dynamic bearing unit is reduced in some cases, and rotation of the disk may become unstable. Therefore, the conventional disk drive device is disadvantageous in that if the rotation becomes unstable, there is a possibility that a failure occurs in a normal read operation and a normal write operation of magnetic data in the worst case.

It is an object of one aspect of the invention to provide a thinner disk drive device capable of stably rotating a recording disk.

The disk drive device of the one aspect of the invention includes: a base member; a hub on which a recording disk is to be placed; a bearing unit arranged on the base member for rotatably supporting the hub; and a spindle drive unit for rotationally driving the hub. The spindle drive unit includes a stator core having salient poles, a coil wound around each of the salient poles, and a magnet having a plurality of magnetic poles arranged in a circumferential direction so as to be opposed to the salient poles. The hub includes an outer cylindrical portion formed of a magnetic material and adapted to be engaged with an inner periphery of the recording disk, and an inner cylindrical portion fixing an outer periphery of the magnet. The number of magnetic poles is an even number in a range of 10 to 16, and the number of salient poles is a multiple of 3 in a range of 12 to 24.

BRIEF DESCRIPTION OF THE DRAWINGS

The foregoing and other objects, features, aspects and advantages of the invention will become more apparent from the following detailed description when taken in conjunction with the accompanying drawings, in which.

DESCRIPTION OF EMBODIMENTS

A preferred embodiment of the invention will be described below with reference to the accompanying drawings, in which like reference characters designate similar or identical parts throughout the several views thereof.

The disk drive device of the one aspect of the invention includes: a base member; a hub on which a recording disk is to be placed; a bearing unit arranged on the base member for rotatably supporting the hub; and a spindle drive unit for rotationally driving the hub. The spindle drive unit includes a stator core having salient poles, a coil wound around each of the salient poles, and a magnet having a plurality of magnetic poles arranged in a circumferential direction so as to be opposed to the salient poles. The hub includes an outer cylindrical portion formed of a magnetic material and adapted to be engaged with an inner periphery of the recording disk, and an inner cylindrical portion fixing an outer periphery of the magnet. The number of magnetic poles is an even number in a range of 10 to 16, and the number of salient poles is a multiple of 3 in a range of 12 to 24.

According to this aspect, the number of salient poles is as many as 12 or more. For this reason, the total number of turns of the coil can be increased. According to this configuration, a sufficient total number of turns of the coil can be secured even in a thinner disk drive device. It is therefore possible to improve reduction in a torque, and thus to stabilize rotation of the recording disk.

According to this aspect, it is possible to further thin the disk drive device and stabilize the rotation of the recording disk.

In the following description, the same symbols are allotted to identical or equivalent constituent elements and members illustrated in the drawings, and redundant description is not repeated as appropriate. Dimensions of members in each of the drawings are scaled up or down as appropriate to facilitate understanding of the invention. In the following description, a lower side in the drawings is expressed as "lower, down or downward" and an upper side in the drawings is expressed as "upper, up or upward" for the sake of convenience.

A disk drive device 100 as one example that is assumed in this embodiment is adapted to be provided with and rotationally drive a so-called 2.5-inch hard disk (recording disk 1) made of glass and having an outer diameter of about 65 mm, an inner diameter of about 20 mm and a thickness of about 0.75 mm.

Figure 1A:
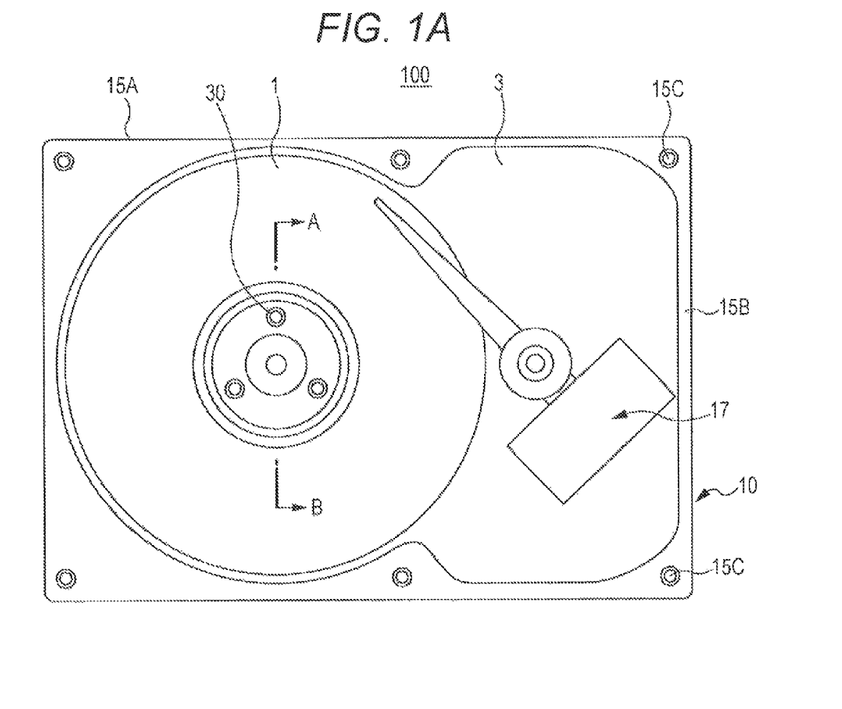
FIGS. 1A and 1B illustrate a disk drive device according to an embodiment.
Figure 1B:
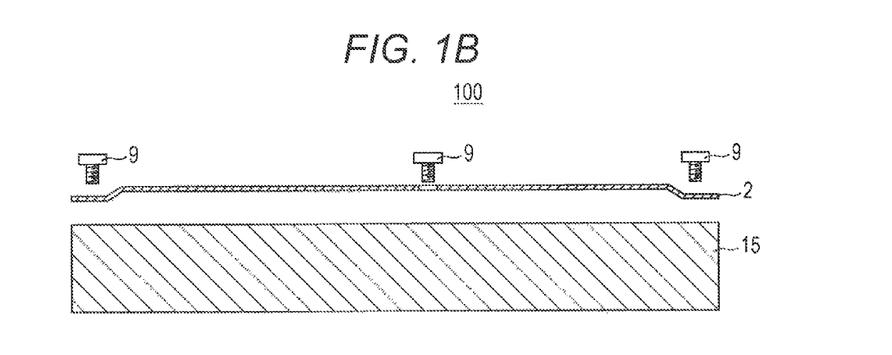
Figure 2:
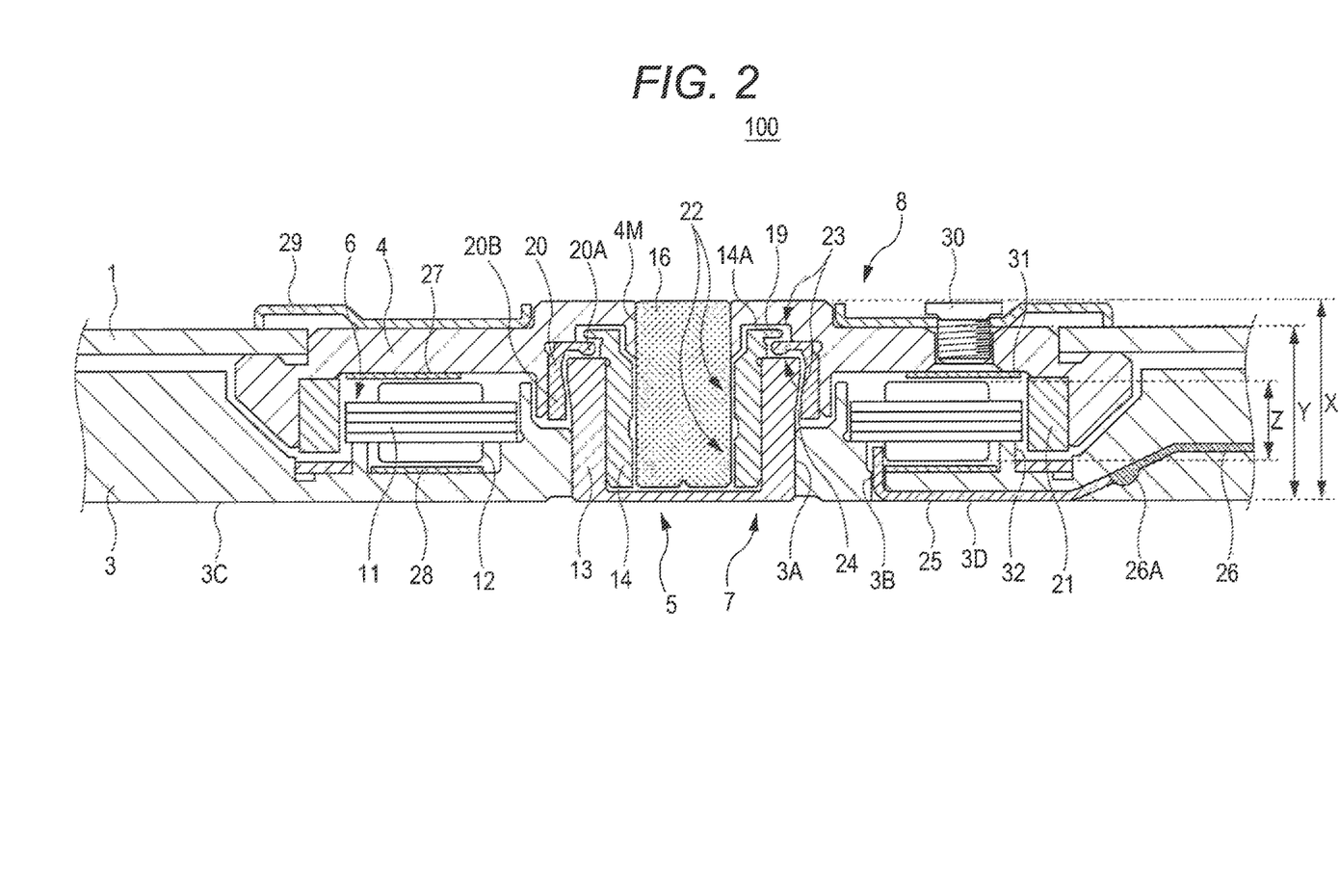
FIG. 2 is a sectional view of a portion of the disk drive device according to the embodiment.
Figure 3:
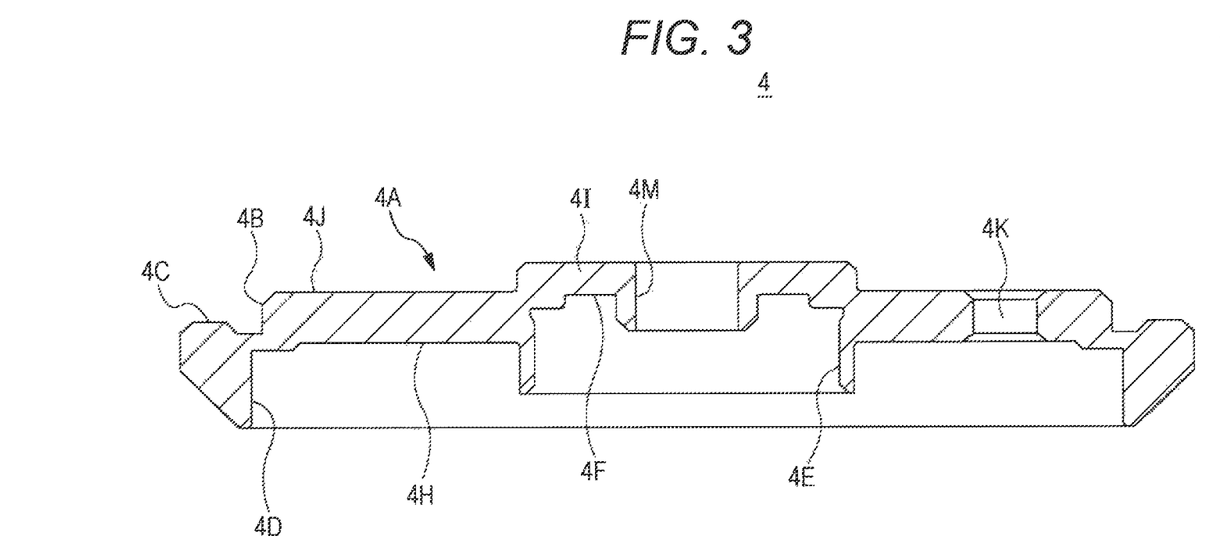
FIG. 3 is a sectional view of a hub according to the embodiment.

FIGS. 1A and 1B illustrate the disk drive device 100 according to the embodiment. FIG. 1A is a plan view of the disk drive device 100, and FIG. 1B is a side view of the disk drive device 100. FIG. 1A illustrates a state where a top cover 2 is removed. FIG. 2 is a sectional view of a portion of the disk drive device 100 according to the embodiment. FIG. 3 is a sectional view of a hub 4 according to the embodiment. FIGS. 2 and 3 are sectional views taken along the line A-B in FIG. 1A.

The disk drive device 100 rotationally drives the recording disk 1 that is a magnetic recording medium.

The disk drive device 100 includes a stator 7 having a fixed member that does not rotate, and a rotor 8 having a rotating member.

First, the stator 7 will be described. The stator 7 includes a chassis 10, a head drive unit 17, the top cover 2, a screw 9, a stator core 11, a coil 12, a housing 13 and a sleeve 14.

The chassis 10 has a substantially rectangular cross section with an open top. As illustrated in FIGS. 1A and 1B, the chassis 10 includes a base member 3 and a peripheral annular wall portion 15.

The base member 3 is a flat, depressed portion. As illustrated in FIG. 2, the base member 3 includes a bearing hole 3A into which the housing 13, the sleeve 14 and a shaft 16 are inserted.

As illustrated in FIGS. 1A and 1B, the peripheral annular wall portion 15 is formed into a wall-like shape so as to surround the base member 3. An outer circumferential surface of the peripheral annular wall portion 15 is rectangular in shape. An inner circumferential surface of the peripheral annular wall portion 15 is constituted by an annular portion 15A surrounding the recording disk 1 and a rectangular portion 15B surrounding a region where the head drive unit 17 is placed.

The peripheral annular wall portion 15 serves as a support member for the disk drive device 100 that supports the disk drive device 100 in a rotational axis direction of the shaft 16. The base member 3 serves as a support member for the disk drive device 100 that supports the disk drive device 100 in a direction perpendicular to the rotational axis direction of the shaft 16.

The top cover 2 covers a space formed by the depressed portion (base member 3) of the chassis 10. As illustrated in FIG. 1B, the top cover 2 is provided on an upper end of the peripheral annular wall portion 15. The top cover 2 is fixed to the peripheral annular wall portion 15 by engaging a screw 9 with a screw hole 15C formed in an upper end surface of the peripheral annular wall portion 15. The space formed by the depressed portion (base member 3) of the chassis 10 is hermetically closed with the chassis 10 and the top cover 2. A clean air space is formed in the space. The clean air space is filled with clean air from which particles are removed. The recording disk 1, the rotor 8 and the head drive unit 17 are arranged in the clean air space.

The stator core 11 shown in FIG. 2 is fixed to the base member 3. The stator core 11 includes an annular portion and a plurality of salient poles extending from the annular portion in a radial direction. The stator core 11 is formed by laminating a plurality of magnetic plate materials such as silicon steel plates and applying insulating coating such as electrodeposition coating or powder coating to a surface of the laminated magnetic plate materials. The stator core 11 may have dimensions of 9 mm in inner diameter of the annular portion, and 18 mm in diameter of a circumcircle of the salient poles, for example. The stator core 11 may have a thickness of 1 mm by laminating five silicon steel plates of 0.2 mm in thickness.

The coil 12 is a three-phase coil wound around the salient poles of the stator core 11. The coil 12 is made of a wire 25. The wire 25 is wound around one of the salient poles of the stator core 11 a predetermined number of turns from its lower side and is then continuously wound around an adjacent salient pole of the stator core 11 from its upper side. An axial dimension of the coil 12 wound around the salient poles may be 0.6 mm, for example. The wire 25 is continuously wound around the salient poles of the stator core 11 a predetermined number of turns. Then, a winding end of the wire 25 is drawn out from the lower side of a salient pole of the stator core 11. The winding end of the wire 25 is further drawn out to a side opposite to the base member 3 through a wire hole 3B formed in the base member 3. Then, the wire 25 is electrically connected to a wiring member 26 arranged on a back surface of the base member 3. The drawn-out winding end of the wire 25 is fixed by means of an adhesive so that the winding end is not untied. By fixing the winding end in this manner, the wire 25 is prevented from being broken by such a phenomenon that the wire 25 resonates with ultrasound and oscillates with large amplitude during ultrasonic cleaning.

The housing 13 is formed into a bottomed cup shape. A portion of an outer circumferential surface of the housing 13 is fixed to the bearing hole 3A formed in a substantially central portion of the base member 3. A bottom portion is formed on a lower end of the housing 13. The bottom portion is sealed so that a lubricant does not leak outside.

The sleeve 14 has a substantially cylindrical shape, and is inserted into the housing 13. A portion of an outer circumferential surface of the sleeve 14 is fixed to an inner circumferential surface of the housing 13 by adhesion or the like. An overhanging member 19 overhanging radially outward is fixed to an open end surface 14A on an upper side of the sleeve 14.

The overhanging member 19 cooperates with a later-described suspending portion 20 mounted on the hub 4 to limit movement of the hub 4 in its axial direction. According to this configuration, the overhanging member 19 and the suspending portion 20 cooperate with each other to prevent the rotor 8 from being separated.

Next, the rotor 8 will be described. The rotor 8 includes the shaft 16, the hub 4 and the magnet 21.

The shaft 16 serves as a rotary shaft of the disk drive device 100. The shaft 16 is inserted into the sleeve 14. An upper end of the shaft 16 is fixed to a shaft hole 4M formed in a central portion of the hub 4.

The hub 4, on which the doughnut-shaped recording disk 1 is placed, has a substantially saucer-shape.

The magnet 21 is fixed to an inner cylindrical portion 4D of the hub 4, and has a substantially cylindrical shape. The magnet 21 is mounted on the hub 4 so that the magnet 21 is opposed to tips of the salient poles of the stator core 11. The magnet 21 is made of a Nd—Fe—B (neodymium-iron-boron) based rare-earth material. A surface of the magnet 21 is subjected to anticorrosive processing by electrodeposition coating or spray coating. The magnet 21 includes a plurality of driving magnetic poles along a circumferential direction of an inner peripheral portion thereof. The magnet 21 may have a substantially ring shape of 18.4 mm inner diameter, 20.4 mm outer diameter and 2 mm thickness in its axial direction, for example.

A structure of the hub 4 will be described concretely with reference to FIG. 3. The hub 4 is made of a soft magnetic material (e.g., SUS430F). It is preferable that the entire hub 4 be made of a magnetic material in terms of producing a magnetic shielding effect. The hub 4 is formed into the predetermined substantially saucer-shape by pressing or cutting an iron steel plate. Stainless steel under the trade name DHS1 produced by Daido Steel Co., Ltd. is preferable in that an amount of outgas is small and it is easy to machine this stainless steel. Further, stainless steel under the trade name DHS2 produced by Daido Steel Co., Ltd. is more preferable in that it has a more excellent corrosion resistance.

As illustrated in FIG. 3, the shaft hole 4M is formed in a central portion of the hub 4. An annular central portion 4I is formed around the shaft hole 4M. An axial dimension of the shaft hole 4M is larger than that of a portion of the central portion 4I opposed to an upper end surface of the sleeve 14. A portion of an outer circumferential surface of the shaft hole 4M projects downward. According to this configuration, bonding surfaces of the hub 4 and the shaft 16 are secured even if the disk drive device 100 is thinned.

An upper end surface 4A of the hub 4 is divided into upper and lower two stepped portions. The upper stepped portion is the central portion 4I. A lowered portion 4J that is lowered by one step relative to the central portion 4I is formed annularly around the central portion 4I. An inner diameter of the lowered portion 4J may be 8 mm, for example. Such an inner diameter is preferable in terms of easy machining. As illustrated in FIGS. 2 and 3, a clamper 29 is arranged on an upper surface of the lowered portion 4J. A cylindrical portion that connects the central portion 4I and the lowered portion 4J with each other is fitted into a central hole of the clamper 29. An axial dimension of the cylindrical portion may be 0.8 mm to 0.7 mm, for example. This dimension is preferable in that projection of the clamper 29 can be suppressed. A clamper locking portion that locks the clamper 29 is formed on the upper surface of the lowered portion 4J. More specifically, a plurality of screw holes 4K are formed in the upper surface of the lowered portion 4J in its circumferential direction at equal intervals. These screw holes 4K constitute the clamper locking portion. The clamper 29 is locked to the hub 4 by engaging screws 30 with the screw holes 4K.

As illustrated in FIG. 3, an annular outer cylindrical portion 4B is formed by a cylindrical surface extending downward from an outer peripheral end of the lowered portion 4J. An annular extending portion 4C extending radially outward is formed on a lower end of an outer circumference of the outer cylindrical portion 4B. As illustrated in FIGS. 2 and 3, an inner circumferential surface of the central hole of the recording disk 1 is engaged with the outer cylindrical portion 4B of the hub 4. An end of the recording disk 1 is placed on an upper surface of the annular extending portion 4C. A diameter of the outer cylindrical portion 4B may be 20 mm. A height difference between the upper surface of the annular extending portion 4C and the lowered portion 4J in the axial direction may be 0.7 mm to 0.8 mm. An outer diameter of the annular extending portion 4C may be 24 mm. By employing such dimensions, the so-called 2.5-inch recording disk 1 can be engaged with high accuracy.

The annular extending portion 4C hangs down toward the base member 3, and is located in a radially outward region of an outer periphery of the magnet 21. The annular extending portion 4C serves as a back yoke of the magnet 21. An axial dimension of the annular extending portion 4C may be 2.5 mm to 3 mm, for example. This dimension is preferable in that leakage flux can be suppressed. As illustrated in FIG. 2, the outer periphery of the magnet 21 is fixed to the inner cylindrical portion 4D forming an inner surface of the annular extending portion 4C.

As illustrated in FIG. 3, an annular projection 4E is formed on a lower surface of the hub 4. The annular projection 4E projects toward the base member 3 between the housing 13 and the stator core 11. The annular suspending portion 20 is fixed to an inner circumferential surface of the annular projection 4E of the hub 4 by adhesion (see FIG. 2).

A lower end surface 4F of the hub 4 opposed to the open end surface 14A of the sleeve 14 is located on a back surface of the central portion 4I. A portion 4H of the hub 4 opposed to the coil 12 is located on aback surface of the lowered portion 4J.

Some of the members of the disk drive device 100 constitute a bearing unit 5 or a spindle drive unit 6 of the disk drive device 100.

The bearing unit 5 will be described. The bearing unit is arranged on the base member 3, and relatively rotatably supports the hub 4 (rotor 8). The bearing unit 5 includes the shaft 16, the sleeve 14, the housing 13, the overhanging member 19 and the suspending portion 20 as described above. The bearing unit 5 further includes radial dynamic pressure grooves 22, thrust dynamic pressure grooves 23 and a capillary seal portion 24 shown in FIG. 2.

The radial dynamic pressure grooves 22 and the thrust dynamic pressure grooves 23 serve as bearings that rotatably support the hub 4. The two herringbone-shaped radial dynamic pressure grooves 22 are formed in at least one of an inner circumferential surface of the sleeve 14 and an outer circumferential surface of the shaft 16 so that the two radial dynamic pressure grooves 22 are vertically apart from each other. The thrust dynamic pressure grooves 23 have herringbone shapes or spiral shapes. The thrust dynamic pressure grooves 23 are formed in a surface of the suspending portion 20 opposed to an open end surface of the housing 13 and in an upper surface of the suspending portion 20 opposed to a lower surface of the overhanging member 19. The thrust dynamic pressure grooves 23 may be formed in at least one of the open end surface 14A of the sleeve 14 and the lower end surface 4F of the hub 4 opposed to the open end surface 14A.

Rotation of the shaft 16 makes the radial dynamic pressure grooves 22 generate radial dynamic pressure in the lubricant. As a result, the rotor 8 is supported in the radial direction. On the other hand, rotation of the suspending portion 20 makes the thrust dynamic pressure grooves 23 generate thrust dynamic pressure in the lubricant. As a result, the rotor 8 is supported in a thrust direction.

The capillary seal portion 24 is formed by an inner circumferential surface of the cylindrical portion of the suspending portion 20 and the outer circumferential surface of the housing 13. A gap between the inner circumferential surface of the suspending portion 20 and the outer circumferential surface of the housing 13 gradually widens toward its lower open end. A lubricant such as oil is introduced into a space defined by the radial dynamic pressure grooves 22, the surfaces opposed thereto, the thrust dynamic pressure grooves 23, the surfaces opposed thereto and the capillary seal portion 24. An interface (liquid surface) where the lubricant and outside air are in contact with each other is set at an intermediate position of the capillary seal portion 24. The capillary seal portion 24 can prevent the lubricant from leaking out by capillary action.

Next, the spindle drive unit 6 will be described. The spindle drive unit 6 includes the stator core 11, the coil 12 and the magnet 21 as described above.

The spindle drive unit 6 rotationally drives the rotor 8 including the hub 4. That is, if three-phase substantially sine wave current flows through the coil 12 via the wiring member 26 arranged on the back surface of the base member 3 by a predetermined drive circuit, the coil 12 produces a rotating magnetic field at the salient poles of the stator core 11. A rotational driving force is generated in the rotor 8 including the magnet 21 by interaction between the rotating magnetic field and the driving magnetic poles of the magnet 21, and the rotor 8 rotates.

The spindle drive unit 6 will be described in more detail.

A thickness of the disk drive device 100 in its axial direction is defined as a dimension from the upper end surface of the top cover 2 to the lower end surface of the base member 3 along a direction of a rotation axis of the recording disk 1. To reduce the thickness of the disk drive device 100 in its axial direction, an axial dimension from an upper end of the hub 4 to a lower end of the base member 3 (hereinafter referred to as an axial dimension X) should be reduced. If the axial dimension X is set to 6 mm or less, the axial thickness of the disk drive device 100 can be set to 7 mm or less even if a dimension of the top cover 2 and a gap between the top cover 2 and the hub 4 are added. If the axial dimension X is set to 5.5 mm or less, the axial thickness of the disk drive device 100 can more easily be set to 7 mm or less.

To reduce the axial dimension X, an axial dimension of a portion of the disk drive device 100 where the hub 4, the base member 3, the stator core 11 and the coil 12 are laid on one another in the axial direction (hereinafter referred to as an axial dimension Y) is typically reduced. If the axial dimension Y is set to 5.3 mm or less, for example, the axial dimension X can be set to 6 mm or less even if a space where the clamper 29 that fixes the recording disk 1 to the hub 4 is arranged is taken into account. If the axial dimension Y is set to 4.8 mm or less, the axial dimension X can easily be set to 5.5 mm or less.

If the hub 4 and the base member 3 are thinned to reduce the axial dimension Y, however, the stiffness of the disk drive device 100 may be reduced. If the stiffness of the disk drive device 100 is reduced, the recording disk 1 oscillates even when the recording disk 1 receives a slight impact. Therefore, recording and reproducing operations of data become unstable. Hence, an axial dimension between a surface of the coil 12 opposed to the hub 4 and a surface of the coil 12 which is opposed to the base member (hereinafter referred to as an axial dimension Z) may be set to 3 mm or less. It is preferable to set the axial dimension Z to 3 mm or less in that it is possible to suppress the reduction in stiffness of the hub 4 and the base member 3 even if the axial dimension Y is set to 5.3 mm or less. If the axial dimension Z is reduced, the salient poles of the stator core 11 are also thinned. Therefore, the strength of the stator core 11 is reduced, and the stator core 11 may be deformed in some cases in winding of the coil 12. The present inventors confirmed by experiments that if the axial dimension Z was 2 mm or more when a diameter of a circumcircle of the salient poles of the stator core 11 was in a range of 15 mm to 25 mm, deformation of the salient pole in winding of the coil 12 fell within a permissible range.

To reduce the axial dimension Z, the coil 12 is typically thinned. If the coil 12 is thinned, the number of turns of the coil 12 that can be wound around the salient poles of the stator core 11 is reduced. If the number of turns of the coil 12 is small, a torque of the spindle drive unit 6 is lowered. Therefore, rotation of the recording disk 1 becomes unstable. If the rotation becomes unstable, there is a possibility that a failure occurs in a normal read operation and a normal write operation of magnetic data in the worst case.

To address this concern, according to the disk drive device 100 of the embodiment, the number of the salient poles of the stator core 11 is 12 or more. The number of turns of the coil is increased with the number of the salient poles of the stator core 11. Since the number of the salient poles of the stator core 11 is increased to 12 or more, it is possible to suppress the reduction in the torque of the spindle drive unit 6 caused by the number of turns of the coil 12 even if the coil 12 is thinned. Hence, the recording disk 1 can be rotated in an excellent manner. To drive the spindle drive unit 6 in three-phase, the number of the salient poles of the stator core 11 may be set to a multiple of three. Such a configuration is preferable in that a smooth drive torque can be obtained. If the number of the salient poles of the stator core 11 is too large, the salient poles become thinner, and thus, the salient poles are easily deformed. Therefore, since it becomes necessary to carefully carry out a machining operation of the stator core 11, labor is required to assemble the disk drive device 100. It is preferable to set the number of the salient poles of the stator core 11 to 24 or less because it is possible to easily carry out the machining operation of the stator core 11 even when a diameter of a circumcircle of the salient poles of the stator core 11 is 25 mm or less.

The inventors found by experiments that if the number of the driving magnetic poles of the magnet 21 was small, oscillation caused by pulsation of a torque of the spindle drive unit 6 became large. If the oscillation of the spindle drive unit 6 is large, a magnetic head of the head drive unit 17 oscillates, and there is a possibility that a failure occurs in a normal read operation and a normal write operation of magnetic data. To address this concern, in the disk drive device 100 of the embodiment, the number of the driving magnetic poles of the magnet 21 is set to 10 or more. Since the number of the driving magnetic poles of the magnet 21 is increased to 10 or more, it is possible to suppress the oscillation of the spindle drive unit 6. If the number of the driving magnetic poles of the magnet 21 is too large, intervals between adjacent magnetic poles become smaller. Therefore, it becomes difficult to sufficiently strongly magnetize the magnetic poles. If the magnetizing strength of the driving magnetic poles of the magnet 21 is insufficient, a torque of the spindle drive unit 6 is lowered. Therefore, rotation of the recording disk 1 becomes unstable. If the rotation of the recording disk 1 becomes unstable, there is a possibility that a failure occurs in a normal read operation and a normal write operation of magnetic data in the worst case. It is preferable to set the number of the driving magnetic poles of the magnet 21 to 16 or less in that it is possible to sufficiently strongly magnetize the magnetic pole even when the inner diameter of the magnet 21 is 25 mm or less.

The inventors confirmed by experiments that if a diameter of a circumcircle of the salient poles of the stator core 11 was in a range of 15 mm to 25 mm, an inner diameter of the magnet 21 was in a range of 15 mm to 25 mm and an axial dimension Y thereof was in a range of 4.3 mm to 5.3 mm, for example, the number of the driving magnetic poles of the magnet 21 could be set to 10 and the number of salient poles of the stator core 11 could be set to 15. The inventors also confirmed by experiments that if the above configuration was employed, it was possible to suppress the reduction in torque of the spindle drive unit 6, and thus, excellent rotation of the recording disk 1 was secured and oscillation thereof was reduced. The inventors also confirmed by experiments that machining of the stator core 11 was facilitated.

The inventors also confirmed by experiments that if a diameter of a circumcircle of the salient poles of the stator core 11 was in a range of 15 mm to 25 mm, an inner diameter of the magnet 21 was in a range of 15 mm to 25 mm and an axial dimension Y thereof was in a range of 4.3 mm to 5.3 mm, for example, the number of the driving magnetic poles of the magnet 21 could be set to 12 and the number of salient poles of the stator core 11 could be set to 18. The inventors also confirmed by experiments that if the above configuration was employed, it was possible to further suppress the reduction in torque of the spindle drive unit 6, and thus, excellent rotation of the recording disk 1 was secured and oscillation thereof was reduced. The inventors also confirmed by experiments that machining of the stator core 11 was facilitated.

The inventors also confirmed by experiments that if a diameter of a circumcircle of the salient poles of the stator core 11 was in a range of 15 mm to 25 mm, an inner diameter of the magnet 21 was in a range of 15 mm to 25 mm and an axial dimension Y thereof was in a range of 4.3 mm to 5.3 mm, for example, the number of the driving magnetic poles of the magnet 21 could be set to 14 and the number of salient poles of the stator core 11 could be set to 21. The inventors also confirmed by experiments that if the above configuration was employed, it was possible to suppress the reduction in torque of the spindle drive unit 6, and thus, excellent rotation of the recording disk 1 was secured and oscillation thereof was reduced. The inventors also confirmed by the experiment that machining of the stator core 11 was facilitated.

The inventors also confirmed by experiments that if a diameter of a circumcircle of the salient poles of the stator core 11 was in a range of 15 mm to 25 mm, an inner diameter of the magnet 21 was in a range of 15 mm to 25 mm and an axial dimension Y thereof was in a range of 4.3 mm to 5.3 mm, for example, the number of the driving magnetic poles of the magnet 21 could be set to 16 and the number of salient poles of the stator core 11 could be set to 24. The inventors also confirmed by experiments that if the above configuration was employed, it was possible to suppress the reduction in torque of the spindle drive unit 6, and thus, excellent rotation of the recording disk 1 was secured and oscillation thereof was reduced. The inventors also confirmed by experiments that machining of the stator core 11 was facilitated.

The inventors also confirmed by experiments that if a diameter of a circumcircle of the salient poles of the stator core 11 was in a range of 15 mm to 25 mm, an inner diameter of the magnet 21 was in a range of 15 mm to 25 mm and an axial dimension Y thereof was in a range of 4.3 mm to 5.3 mm, for example, the number of the driving magnetic poles of the magnet 21 could be set to 16 and the number of salient poles of the stator core 11 could be set to 12. The inventors also confirmed by experiments that if the above configuration was employed, it was possible to suppress the reduction in torque of the spindle drive unit 6, and thus, excellent rotation of the recording disk 1 was secured and oscillation thereof was reduced. The inventors also confirmed by experiments that machining of the stator core 11 was facilitated.

Figure 4:
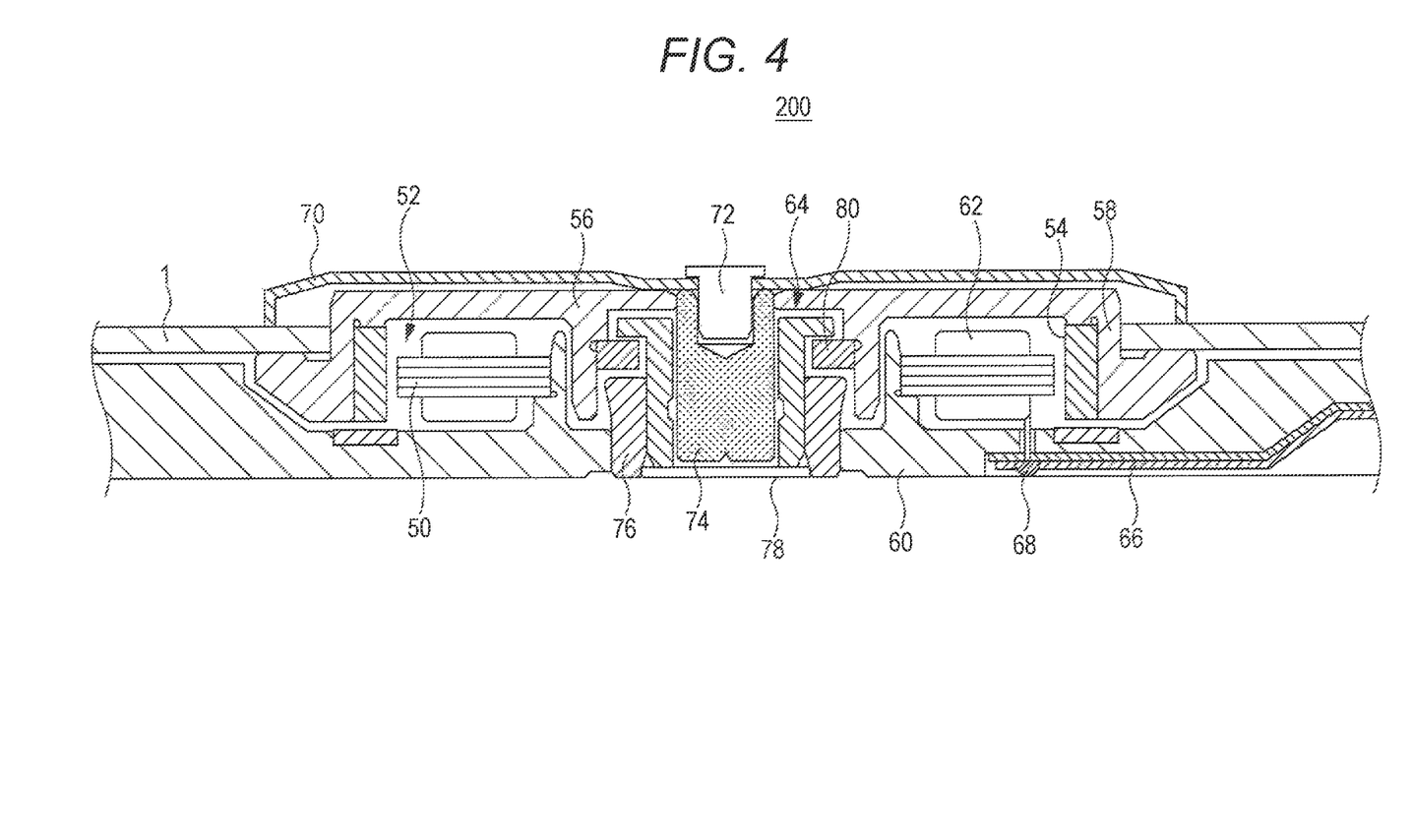
FIG. 4 is a sectional view of a portion of a disk drive device according to a comparative technique.

A concern recognized by the present inventors will be described based on a comparative technique shown in FIG. 4. FIG. 4 is a sectional view of a portion of a disk drive device 200 according to the comparative technique. According to the disk drive device 200 of the comparative technique, if the disk drive device 200 is thinned, a spindle drive unit 52 including a stator core 50 is thinned correspondingly. If the spindle drive unit 52 is thinned, a torque is reduced, and thus, rotation of the recording disk 1 becomes unstable. There is a concern here that if the rotation of the recording disk 1 becomes unstable, there is a possibility that a failure occurs in a normal read operation and a normal write operation of magnetic data in the worst case.

There is also a method using a magnet 54 having a larger diameter to recover the reduced torque. However, according to such a configuration that the recording disk 1 is located in a region which is an extension of an outer periphery of the magnet 54, a back yoke portion 58 of a hub 56 located between an inner periphery of the recording disk 1 and an outer periphery of the magnet 54 is thinned with a diameter of the magnet 54. The back yoke portion 58 is a portion of a magnetic circuit through which a magnetic flux coming from the outer periphery of the magnet 54 passes, and if the back yoke portion 58 is thinned, the back yoke portion 58 is magnetically saturated. If the back yoke portion 58 is magnetically saturated, the magnetic flux is not increased even if the magnetic flux is intensified. Therefore, since an increase in the magnetic flux that contributes to a torque becomes small, the torque cannot be increased. On the other hand, a magnetic flux leaking toward the recording disk 1 is largely increased. Therefore, according to the configuration that the recording disk 1 is an extension of the outer periphery of the magnet 54, if the back yoke portion 58 is thinned, there is a possibility that a failure occurs in a normal read operation and a normal write operation of magnetic data as a result of the leakage flux. This fact is an inhibition factor in thinning the disk drive device 200. If the back yoke portion is thickened in the comparative technique, the magnet 54 has to be reduced in dimension correspondingly. Therefore, an increase in torque cannot be expected.

Referring back to FIG. 2, to address this concern according to the disk drive device 100 of the embodiment, the recording disk 1 is separated from the region on the extension of the outer periphery of the magnet 21 in the radial direction. That is, the recording disk 1 is arranged at a position above the magnet 21 in the axial direction. According to this configuration, it is possible to reduce a magnetic flux leaking toward the recording disk 1. In addition, as illustrated in FIG. 3, a diameter of the inner cylindrical portion 4D of the hub 4 is larger than that of the outer cylindrical portion 4B of the hub 4. As a result, the outer periphery of the magnet 21 can be increased. Therefore, since an amount of the magnetic flux of the driving magnetic poles of the magnet 21 is increased, a torque is increased. Thus, it is possible to thin the disk drive device 100 in a favorable manner. Since the recording disk 1 is arranged at the position above the magnet 21 in the axial direction and separated from the region on the extension of the outer periphery of the magnet 21 in the radial direction, the back yoke (annular extending portion 4C) of the hub 4 can have a sufficiently large thickness in the radial direction. As a result, even if the magnet 21 having larger energy product is employed, influence of the leakage flux can be reduced and a torque can be increased.

For example, the hub 4 is made of a magnetic material, and an axial distance between an upper surface of the magnet 21 and an upper surface of the annular extending portion 4C on which the recording disk 1 is placed is set to 1 mm or less. This configuration is preferable in that the disk drive device 100 can be made thin. Further, it is preferable to set an axial distance between the upper surface of the annular extending portion 4C and the upper surface of the magnet 21 to 0.5 mm or more in that a magnetic flux leaking toward the recording disk 1 can be suppressed. Further, it is advantageous to set an axial distance between the upper surface of the annular extending portion 4C and the upper surface of the magnet 21 to 0.76 mm, for example, in that the disk drive device 100 can be made thin and the leakage flux can be suppressed.

A diameter of a circle connecting tips of the stator core 11 with each other may be 80% or more of a diameter of the outer cylindrical portion 4B of the hub 4. A diameter of a circle circumscribing the salient poles of the stator core 11 may be set to 22 mm, and a diameter of the outer cylindrical portion 4B may be set to 20 mm. Since the number of turns of the coil 12 can be increased by making the stator core 11 large, a torque can be increased. If the number of turns of the coil 12 is not increased, the coil 12 can be thinned. This fact is advantageous in that the disk drive device 100 can further be thinned. If the diameter of the circle connecting the tips of the stator core 11 with each other exceeds 140% of the diameter of the outer cylindrical portion 4B, there is a possibility that the leaked magnetic flux of the magnet 21 acts on the recording disk 1. Thus, there is a possibility that a failure occurs in a normal read operation and a normal write operation of magnetic data. Therefore, it is preferable that the diameter of the circle connecting the tips of the stator core 11 with each other be in a range of 80% to 140% of the diameter of the outer cylindrical portion 4B.

The base member 3 has a wire hole 3B through which the wire 25 forming the coil 12 is inserted. A portion (drawn-out line) of the wire 25 forming the coil 12 that is drawn out from the coil 12 is guided to the back surface 3C of the base member 3 through the wire hole 3B. This back surface 3C is a surface of the base member 3 opposite from a side opposed to the hub 4 (surface of the base member 3 that is not opposed to the hub 4).

According to the comparative technique shown in FIG. 4, the drawn-out line of the wire 25 is connected to a wiring member 66 by soldering at a position immediately after the drawn-out line is drawn out from a coil 62 (position directly below the coil 62), and a connected portion 68 is formed at this position. A thickness of the wiring member 66 and a height of the connected portion 68 at the position directly below the coil 62 become an obstacle to thinning the spindle drive unit 52.

Referring back to FIG. 2, to address this concern in the disk drive device 100, the drawn-out line of the wire 25 is drawn out to the back surface 3C of the base member 3 through the wire hole 3B, and is electrically connected to the wiring member 26 at a position outside of the outer diameter of the magnet 21 in the radial direction. According to this configuration, a connection 26A between the drawn-out line and the wiring member 26 is arranged at a position deviated from below the magnet 21 (spindle drive unit 6). Thus, the spindle drive unit 6 can be thinned by the height of the connection 26A. The number of members arranged in a region of the base member 3 outside of the magnet 21 in the radial direction is smaller than the number of members arranged in a region where the spindle drive unit 6 is arranged. Therefore, the region of the base member 3 outside of the magnet 21 in the radial direction can be made thin. The connection 26A can be provided in the thinned region of the base member 3.

The base member 3 may be made of metal such as aluminum. In such a case, if the wire 25 drawn out to the back surface 3C of the base member 3 directly comes into contact with the base member 3, an electric short circuit may be established. To address this concern, a groove 3D is provided in the back surface 3C of the base member 3. The wire 25 is guided from the wire hole 3B to the wiring member 26 (connection 26A) through the groove 3D. The groove 3D is insulated. As a result, a possibility that an electric short circuit is established between the wire 25 and the base member 3 is decreased. If the groove 3D is combined with the configuration that the connection 26A is positioned outside of the magnet 21 in the radial direction, the spindle drive unit 6 can be thinned by the thickness of the wiring member 66 and the height of the connected portion 68 in the comparative technique shown in FIG. 4. Cationic electrodeposition coating (hereinafter referred to as "ED coating"), for example, may be used for insulating the base member 3 produced by aluminum die casting. This insulating process is preferable in that the number of pinholes is reduced.

Next, if the disk drive device 100 is further thinned, the lower surface of the hub 4 and the coil 12 wound around the salient poles of the stator core 11 come very close to each other. In this case, a possibility that the coil 12 comes into contact with the rotating hub 4 becomes high. Therefore, there is a concern that the coil 12 comes into contact with the hub 4 and an electric short circuit is established. To address this concern according to the disk drive device 100, a surface of the coil 12 opposed to the hub 4 and a surface of the coil 12 opposed to the base member 3 are smoothened such that these surfaces are flattened.

Figure 5A:
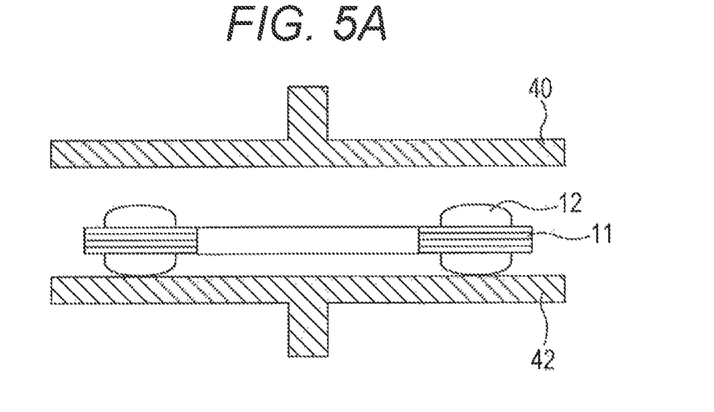
FIGS. 5A to 5C illustrate a coil forming method according to the embodiment.
Figure 5B:
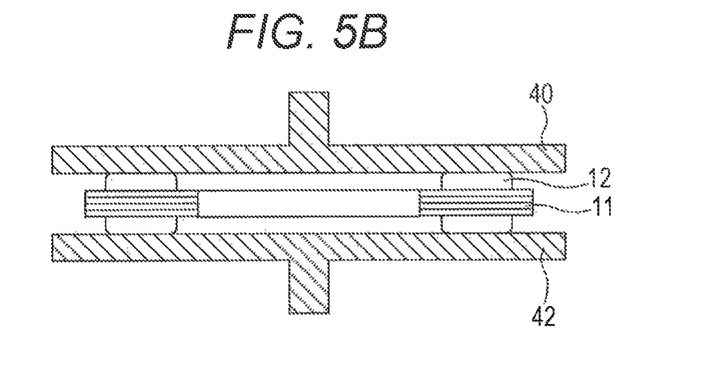
Figure 5C:
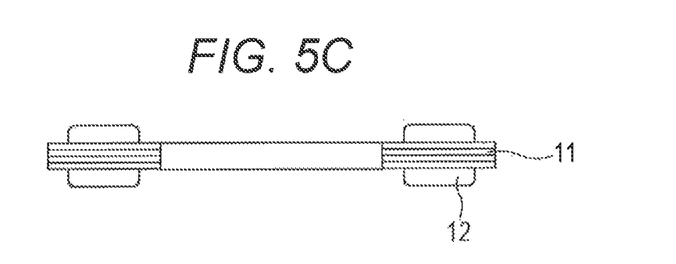

FIGS. 5A, 5B and 5C show a method forming the coil 12 according to the embodiment. FIG. 5A illustrates the coil 12 before it is formed, FIG. 5B illustrates the coil 12 during pressing thereof, and FIG. 5C illustrates the coil 12 after pressing thereof. As shown in these drawings, the coil 12 is formed by sandwiching and pressing the wire 25 wound around the salient poles of the stator core 11 between a first pressing mold 40 and a second pressing mold 42. The pressing surfaces of the first pressing mold 40 and the second pressing mold 42 are flat. By pressing and flattening the coil 12, an axial dimension of the coil 12 is stabilized. Thus, the possibility that the coil 12 comes into contact with the rotating hub 4 can be decreased. Therefore, the axial dimension of the coil 12 can be reduced.

To address the concern that the coil 12 comes into contact with the rotating hub 4, flattening of the wire 25 forming the smoothened coil 12 may be set to 90% or less. The flattening of the wire 25 is a ratio of an axial dimension "b" to a radial dimension "a" of a cross section of one wire 25 that is expressed in percentage (in practice, the flattening of the wire 25 differs depending upon portions thereof, but normally, the lowest flattening is used). The following is an expression of the flattening.

$$\text{Flattening of wire } 25 = (b/a) \times 100$$

When the coil 12 is pressed and formed to limit the dimension of the coil 12 in its axial direction, a portion of the wire 25 having the lowest flattening is the thickest portion in the axial direction. As a result, the possibility that the coil 12 comes into contact with the rotating hub 4 can further be decreased.

To address the concern that the coil 12 comes into contact with the rotating hub 4, a surface of the hub 4 opposed to the coil 12 may be insulated. As a result, a possibility that an electric short circuit is established and a failure occurs in function is decreased. The insulating process may be carried out by a film-pasting process for pasting a resin film on a surface of the hub 4 opposed to the coil 12 by an adhesion member. An annular PET (polyethyleneterephthalate) film 27 may be pasted on the surface of the hub 4 opposed to the coil 12 by a double-stick tape. This process is preferable in terms of easy work.

There is a concern that the coil 12 comes into contact with the base member 3 and an electric short circuit is established. To address this concern, a surface of the base member 3 opposed to the coil 12 may be insulated. As a result, a possibility that the coil 12 comes into contact with the base member 3 and the electric short circuit is established is decreased. The insulating process is realized by ED coating the base member 3 produced by aluminum die casting. This insulating process is preferable in that the number of pinholes is reduced. An annular PET film 28 may be pasted on the surface of the base member 3 opposed to the coil 12 by a double-stick tape. This process is preferable in terms of easy work.

Next, when the disk drive device 100 is thinned, if an axial thickness of the portion 4H of the hub 4 opposed to the coil 12 is reduced, the stiffness of the hub 4 is lowered and a resonance frequency of the disk drive device 100 is lowered. As a result of research carried out by the inventors, they found that main factors that determine the resonance frequency of the disk drive device 100 are the stiffness of the bearing and the stiffness of the hub 4.

If the resonance frequency is lowered, the disk drive device 100 may resonate with variation in drive torque and large oscillation may occur. There is a concern that this oscillation can cause a failure in a normal read operation and a normal write operation of magnetic data in the worst case. To address this concern, an axial width of the hub 4 opposed to the coil 12 may be larger than an axial width of the base member 3 opposed to the coil 12. This is a relative relation between axial dimensions of the base member 3 and the hub 4 in a region where the spindle drive unit 6 is arranged when the disk drive device 100 is thinned. For example, the axial width of the hub 4 opposed to the coil 12 may be 1 mm to 1.4 mm, and the axial width of the base member 3 opposed to the coil 12 may be 0.6 mm to 0.9 mm. It is preferable to set both the widths to these values in that the concern caused when the stiffness of the hub 4 is lowered is relieved. Alternatively, for example, the axial width of the hub 4 opposed to the coil 12 may be 1.2 mm, and the axial width of the base member 3 opposed to the coil 12 may be 0.7 mm. It is advantageous to set both the widths to these values in that the concern caused when the stiffness of the hub 4 is lowered is further relieved.

Next, in the disk drive device 200 according to the comparative technique shown in FIG. 4, a central portion of a clamper 70 is fixed to a central portion of a shaft 74 with a screw 72. For this reason, an axial dimension of the central portion of the hub 56 is reduced by the dimensions of the clamper 70 and the screw 72. If the axial dimension of the central portion of the hub 56 is thinned, the resonance frequency of the disk drive device 200 may be lowered, the disk drive device 200 may resonate with variation in drive torque and large oscillation may occur.

Referring back to FIGS. 2 and 3, to address this concern according to the disk drive device 100 of this embodiment, the clamper 29 is arranged on an upper surface of the lowered portion 4J of the hub 4. A cylindrical portion connecting the central portion 4I and the lowered portion 4J with each other is fitted to the central hole of the clamper 29. The clamper locking portion that locks the clamper 29 is formed on the upper surface of the lowered portion 4J. More specifically, the plurality of screw holes 4K are formed in the upper surface of the lowered portion 4J in its circumferential direction at equal intervals. These screw holes 4K constitute the clamper locking portion. The clamper 29 is locked to the hub 4 by engaging the screws 30 with the screw holes 4K. As a result, it is possible to relieve the concern caused when the axial dimension of the central portion 4I of the hub 4 is reduced. It is preferable to lock the clamper 29 to the hub 4 by engaging the screws 30 with the screw holes 4K in that the shaft 16 can be formed to be long and it is possible to prevent the stiffness of the bearing from being deteriorated.

The screw hole 4K formed in the hub 4 has a concern that an axial dimension of its threaded portion cannot sufficiently be secured. To address this concern, the screw hole 4K is formed to penetrate the hub 4. In addition, a cover member 31 is provided on a portion of a surface of the hub opposed to the coil 12 where the screw hole 4K is formed. As a result, it is possible to relieve the concern that the axial dimension of the threaded portion of the screw hole 4K cannot sufficiently be secured. Various kinds of materials can be used for the cover member 31. A PET film may be pasted on the surface of the hub 4 opposed to the coil 12 by a double-stick tape. This process is preferable in terms of easy work and in that it is possible to insulate between the hub 4 and the coil 12.

Next, according to the disk drive device 200 of the comparative technique shown in FIG. 4, a cylindrical portion 76 and a bottom portion 78 are independent members, and they are adhered and fixed to each other. However, if the disk drive device 200 is thinned, the adhered portions of the cylindrical portion 76 and the bottom portion 78 are also thinned. If the adhered portions are thinned, a bonding strength between the cylindrical portion 76 and the bottom portion 78 is deteriorated and there is a possibility that the adhered portions are disconnected from each other by impact.

Referring back to FIG. 2, to address this concern according to the disk drive device 100 of the embodiment, the housing 13 has a bottomed cup shape in which a cylindrical portion and a bottom portion are formed integrally with each other. As a result, it is possible to relieve the concern that the adhered portions of the cylindrical portion and the bottom portion of the housing 13 are disconnected from each other when the disk drive device 100 is thinned.

Next, in the disk drive device 200 of the comparative technique shown in FIG. 4, an annular member 80 is fixed to an inner periphery of the annular projection of the hub 56 by adhesion. The doughnut-shaped annular member 80 has an axial dimension of 1.2 mm or more to secure a bonding strength with respect to the hub 56. If the disk drive device 200 becomes thinner, the axial dimension of the cylindrical portion of the hub 56 also becomes thinner by a dimension of the annular member 80. If the axial dimension of the central portion of the hub 56 becomes thinner, a resonance frequency of the disk drive device 200 is lowered, and thus, the disk drive device 200 may resonate with variation in drive torque and large oscillation may occur.

Referring back to FIG. 2, to address this concern, the bearing unit 5 of this embodiment includes the overhanging member 19 and the suspending portion 20 that integrally rotates with the hub 4. The overhanging member 19 is non-rotatably arranged at a position opposed to the suspending portion 20 along the axial direction. The suspending portion 20 cooperates with the overhanging member 19 to limit movement of the hub 4 in its axial direction. Widths of the overhanging member 19 and the suspending portion 20 in the axial direction may be 0.6 mm or less. That is, a thickness of a disk portion 20A of the suspending portion 20 may be 0.6 mm or less. As a result, even when the disk drive device 100 is thinned, the axial dimension of the central portion 4I of the hub 4 can be secured. It is preferable that the thickness of the disk portion 20A of the suspending portion 20 be 0.4 mm or less in that the axial dimension of the central portion 4I of the hub 4 can further be thickened.

According to the disk drive device 200 shown in FIG. 4, if the axial dimension of the annular member 80 is reduced, a bonding strength between the annular member 80 and the hub 56 is deteriorated. Therefore, there is a concern that these members are disconnected from each other by impact. To address this concern, as illustrated in FIG. 2, the suspending portion 20 of the disk drive device 100 is formed by integrally forming the disk portion 20A opposed to the overhanging member 19 in the axial direction and a cylindrical portion 20B connected to an outer edge of the disk portion 20A. According to this configuration, it is possible to sufficiently secure the axial dimension of the cylindrical portion 20B that is bonded to the annular projection 4E of the hub 4. As a result, it is possible to relieve the concern that the suspending portion 20 and the hub 4 are disconnected from each other. For example, if the axial dimension of the cylindrical portion 20B is set to 2.0 mm or more, the bonding strength between the suspending portion 20 and the hub 4 can sufficiently be secured. If the axial dimension of the disk portion 20A is set to 0.4 mm or less, the axial dimension of the central portion 4I (see FIG. 3) of the hub 4 can be increased.

There is a concern that much labor is required for machining the suspending portion 20. To address this concern, in the disk drive device 100, the suspending portion 20 may be formed by pressing a metal material. As a result, it is possible to relieve the concern that much labor is required for machining the suspending portion 20.

A thrust dynamic pressure groove 23 may be formed in at least any of surfaces of the disk portion 20A of the suspending portion 20. Specifically, the thrust dynamic pressure groove 23 is formed in at least one of a surface of the disk portion 20A opposed to the open end surface of the housing 13 and a surface of the disk portion 20A opposed to the overhanging member 19. As a result, it becomes easy to machine the thrust dynamic pressure groove 23.

Next, if the disk drive device 100 is thinned, this means that the stator core 11 is also thinned. If the stator core 11 is thinned, there is a possibility that the stator core 11 is mounted in an inclined state when the annular portion is fitted into the base member 3. To address this concern, in the disk drive device 100, a stator core support member 32 is arranged between the base member 3 and the salient poles of the stator core 11 as illustrated in FIG. 2. The stator core support member 32 annularly projects from the base member 3 toward a salient pole of the stator core 11 where the coil 12 is not provided. As a result, an inner periphery and an outer periphery of the stator core 11 are supported by the base member 3. Therefore, by thinning the disk drive device 100, it is possible to relieve the concern that the stator core 11 is inclined.

The stator core support member 32 is formed integrally with the base member 3. This is preferable in that labor for assembling is not required. The stator core support member 32 may be arranged as a member independent from the base member 3. This is preferable because the stator core support member 32 can be made of various kinds of materials such as metal and plastic materials.

A portion of the hub 4 that covers an outer periphery of the magnet 21 serves as a so-called back yoke. If the back yoke becomes thinner, magnetic reluctance is increased. If the magnetic reluctance is increased, a magnetic flux generated by the magnet 21 is reduced. If the magnetic flux is reduced, a torque is reduced, and there is a concern that a failure such as instability of rotation of the recording disk 1 is caused. To address this concern, the hub 4 of the disk drive device 100 includes the annular extending portion 4C extending outward. A diameter of an outer peripheral end of the annular extending portion 4C is larger than that of the inner cylindrical portion 4D of the hub 4 by 4 mm or more. As a result, since a sufficient thickness of the back yoke can be secured, it is possible to relieve the concern caused by reduction in torque.

If a strong magnetic material is used to enhance a torque, a magnetic flux in the back yoke may be saturated and a leakage flux may be increased. If the leakage flux is increased, a noise signal is generated in a magnetic head that reads data. If this noise signal is great, there is a possibility that a failure occurs in a normal read operation and a normal write operation of magnetic data. To address this concern according to the disk drive device 100, saturation magnetic flux density of the annular extending portion 4C that serves as the back yoke is set to 1 T (tesla) or more. According to this configuration, it is possible to secure sufficient saturation magnetic flux density of the back yoke. Thus, it is possible to relieve the concern that the leakage flux is increased. If the saturation magnetic flux density of the hub 4 is set to 1.2 T or more, a stronger magnetic material can be used.

It is also required to further enhance a torque and stabilize rotation. To meet this requirement according to the disk drive device 100, a gap between the magnet 21 and the tips of the salient poles of the stator core 11 is set to 0.4 mm or less. As a result, since an air gap of the magnetic circuit becomes small, an amount of the magnetic flux of the magnet 21 is increased and a torque is thus enhanced. To secure an effect of enhancement of the torque, it is preferable that the gap between the salient poles and the magnet 21 is 0.4 mm or less. To avoid contact between the salient poles and the magnet 21, it is preferable that the gap between the salient poles and the magnet 21 be 0.2 mm or more.

The maximum energy product of the magnet 21 of the embodiment may be 10 MGOe (megagauss oersted) or more. As a result, the amount of the magnetic flux of the magnet 21 is increased, and the torque is thus enhanced. The maximum energy product of the magnet 21 is preferably 10 MGOe or more to secure the effect of enhancement of the torque. To facilitate magnetization, the maximum energy product of the magnet 21 is preferably 16 MGOe or less. If a magnet 21 having such an maximum energy product and a back yoke having saturation magnetic flux density of 1 T or more are combined, it is possible to suppress a leakage flux from the back yoke even if the disk drive device 100 is thinned.

As described above, it is required to further reduce, in thickness and weight, the disk drive device provided in a portable device. To meet the requirement according to the disk drive device 100 of the embodiment, if an inner diameter of the recording disk 1 is set to 20 mm, a thickness of the disk drive device 100 in the axial direction can be set to 7 mm, which is less than 7.5 mm. As a result, it is possible to reduce the portable device in thickness and weight. It is also possible to contribute to saving resources.

As described above, the disk drive device 100 of the embodiment is further thinned so that it can suitably be used for a portable device, and can stably rotate the recording disk 1.

The disk drive device 100 can also be described as including the chassis 10 having the base member 3 and the peripheral annular wall portion 15, the hub 4 on which the doughnut-shaped recording disk 1 is placed, the bearing unit 5 that is arranged on the base member 3 and rotatably supports the hub 4, the spindle drive unit 6 that rotationally drives the hub 4, the head drive unit 17, the top cover 2 and the screw 9. Alternatively, the disk drive device 100 can also be described as including the stator 7 having a stationary member that does not rotate and the rotor 8 having a rotatable member, in which the stator 7 and the rotor 8 include the bearing unit 5 that relatively rotatably supports the hub 4 and the spindle drive unit 6 that rotationally drive the hub 4. The clamper 29 can be described as having the central hole fitted over the annular step between the central portion 4I and the lowered portion 4J. The annular outer cylindrical portion 4B can be described as being formed as a stepped portion which is recessed from the outer peripheral end of the lowered portion 4J. The back surface 3C of the base member 3 can be described as being an upper surface on which the bearing unit 5 is arranged.

The invention is not limited to the above embodiment, and various modifications may be made thereto including design modifications based on knowledge of a person skilled in the art. Configurations shown in the drawings are explanatory only, and modifications can be made thereto as long as similar functions can be achieved, and similar effects can be obtained therefrom.

While the invention has been illustrated and described in detail, the foregoing description is in all aspects illustrative and not restrictive. It is therefore understood that numerous modifications and variations can be devised without departing from the spirit and scope of the invention.

What is claimed is:

1. A disk drive device comprising:
a base member;
a hub on which a recording disk is to be placed;
a bearing unit arranged on the base member for rotatably supporting the hub; and
a spindle drive unit for rotationally driving the hub,
the spindle drive unit comprising:
a stator core including a plurality of salient poles;
a three-phase coil wound around each of the plurality of salient poles; and
a magnet including a plurality of magnetic poles in a circumferential direction so as to be opposed to the plurality of salient poles, respectively,
the hub comprising an outer cylindrical portion to be engaged with an inner periphery of the recording disk, and an inner cylindrical portion upholding the magnet,
the bearing unit being encircled by the recording disk in a radial direction, and including a portion at least partially overlapping the recording disk in an axial direction,
the number of magnetic poles being an even number in a range of 10 to 16, and
the number of salient poles being a multiple of 3 in a range of 12 to 24.

2. The disk drive device according to claim 1, wherein
the number of magnetic poles is 10 and
the number of salient poles is 15.

3. The disk drive device according to claim 1, wherein
the number of magnetic poles is 12 and
the number of salient poles is 18.

4. The disk drive device according to claim 1, wherein
the number of magnetic poles is 14 and
the number of salient poles is 21.

5. The disk drive device according to claim 1, wherein
the number of magnetic poles is 16 and
the number of salient poles is 24.

6. The disk drive device according to claim 1, wherein
the number of magnetic poles is 16 and
the number of salient poles is 12.

7. The disk drive device according to claim 1, wherein a diameter of the inner cylindrical portion is larger than a diameter of the outer cylindrical portion.

8. The disk drive device according to claim 1, wherein a surface of the hub opposed to the coil is insulated.

9. The disk drive device according to claim 1, wherein a surface of the base member opposed to the coil is insulated.

10. The disk drive device according to claim 1, wherein an axial dimension of the hub opposed to the coil is larger than an axial dimension of the base member opposed to the coil.

11. The disk drive device according to claim 1, wherein a gap between the salient poles and the magnet in the radial direction is 0.2 mm or more and 0.4 mm or less.

12. The disk drive device according to claim 1, wherein a diameter of a circumcircle of the salient poles is larger than a diameter of the outer cylindrical portion.

13. The disk drive device according to claim 1, wherein
a diameter of the outer cylindrical portion is 20 mm, and
an axial dimension from an end of the hub opposite to the base member to an end of the base member opposite to the hub is 6 mm or less.

14. The disk drive device according to claim 1, wherein
the coil is formed of a wire, and
the wire has a drawn-out line drawn out to an opposite side of the base member through a hole of the base member, and connected to a node of a wiring member, and
the magnet is provided at an inward location relative to the node in the radial direction.

15. A disk drive device comprising:
a base member;
a hub on which a recording disk is to be placed;
a bearing unit arranged on the base member for rotatably supporting the hub; and
a spindle drive unit for rotationally driving the hub,
the spindle drive unit comprising:
a stator core including a plurality of salient poles;
a three-phase coil wound around each of the plurality of salient poles; and
a magnet including a plurality of magnetic poles in a circumferential direction so as to be opposed to the plurality of salient poles, respectively,
the hub comprising an outer cylindrical portion to be engaged with an inner periphery of the recording disk, and an inner cylindrical portion upholding the magnet,
the bearing unit being encircled by the recording disk in a radial direction, and including a portion at least partially overlapping the recording disk in an axial direction,
a diameter of the outer cylindrical portion being 20 mm,
an axial dimension from an end of the hub opposite to the base member to an end of the base member opposite to the hub being 7.5 mm or less,
the stator core being formed of a plurality of silicon steel plates laminated together and each having a thickness of 0.2 mm,
a thickness of the stator core in an axial direction being substantially half of a thickness of the magnet in the axial direction,
the number of magnetic poles being an even number in a range of 10 to 16, and
the number of salient poles being a multiple of 3 in a range of 12 to 24.

16. The disk drive device according to claim 15, wherein an axial dimension from a surface of the coil opposite to the hub to another surface of the coil opposite to the base member is 3 mm or less.

17. The disk drive device according to claim 15, wherein
the coil is formed of a wire, and
the wire has a drawn-out line drawn out to an opposite side of the base member through a hole of the base member, and connected to a node of a wiring member, and
the magnet is provided at an inward location relative to the node in the radial direction.

18. A disk drive device comprising:
a base member;
a hub on which a recording disk is to be placed;
a bearing unit arranged on the base member for rotatably supporting the hub; and
a spindle drive unit for rotationally driving the hub,
the spindle drive unit comprising:
a stator core including a plurality of salient poles;
a three-phase coil wound around each of the plurality of salient poles; and
a magnet including a plurality of magnetic poles in a circumferential direction so as to be opposed to the plurality of salient poles, respectively,
the hub comprising an outer cylindrical portion to be engaged with an inner periphery of the recording disk, and an inner cylindrical portion upholding the magnet,
the bearing unit being encircled by the recording disk in a radial direction, and including a portion at least partially overlapping the recording disk in an axial direction,
a diameter of the outer cylindrical portion being 20 mm,
an axial dimension from an end of the hub opposite to the base member to an end of the base member opposite to the hub being 7.5 mm or less, the stator core being formed of a plurality of silicon steel plates laminated together and each having a thickness of 0.2 mm, a thickness of the stator core in an axial direction being substantially half of a thickness of the magnet in the axial direction, the number of magnetic poles being an even number in a range of 10 to 16, the number of salient poles being a multiple of 3, the coil being formed of a wire, and the wire having a drawn-out line drawn out to an opposite side of the base member through a hole of the base member, and connected to a node of a wiring member, and the magnet being provided at an inward location relative to the node in the radial direction.

19. The disk drive device according to claim 18, wherein an axial dimension from a surface of the coil opposite to the hub to another surface of the coil opposite to the base member is 3 mm or less.

20. The disk drive device according to claim 18, wherein a portion of the hub which covers an outer periphery of the magnet and which serves as a back yoke of the magnet is formed of a material having a saturation magnetic flux density characteristic that is capable of maintaining a non-saturated condition with the magnet being upheld by the inner cylindrical portion.

* * * * *